United States Patent

Müller

[11] Patent Number: 6,121,708
[45] Date of Patent: *Sep. 19, 2000

[54] SLOT SEALING ARRANGEMENT

[75] Inventor: Günter Müller, Weiz-Nöstl, Austria

[73] Assignee: Asea Brown Boveri AG, Baden, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 09/156,911

[22] Filed: Sep. 18, 1998

[30] Foreign Application Priority Data

Sep. 29, 1997 [DE] Germany .......................... 197 42 900

[51] Int. Cl.⁷ .................. H02K 3/48; H02K 9/00
[52] U.S. Cl. .................. 310/214; 310/59; 310/60 A
[58] Field of Search .................. 310/214, 59, 60 R, 310/52, 58, 62, 63, 60 A, 269

[56] References Cited

U.S. PATENT DOCUMENTS 3,588,557  6/1971  Kilgore et al. .............................. 310/60
4,028,569  6/1977  Towne .................................. 310/64

FOREIGN PATENT DOCUMENTS 964161   5/1957  Germany .
1764687  4/1958  Germany .
1538925  4/1970  Germany .
3901230C1 7/1990  Germany .

OTHER PUBLICATIONS

"Neue Hochspannungs–Kafiglaufermotoren mittlerer Leistung", Erlacher, et al., Brown Boveri Mitteilungen, Sep. 1967, pp. 523–526.

Primary Examiner—Nestor Ramirez
Assistant Examiner—Dang Dinh Le
Attorney, Agent, or Firm—Burns, Doane, Swecker & Mathis, L.L.P.

[57] ABSTRACT

In the case of an electrical machine which has in its laminated stator core (10) slots which comprise winding slots (1) and preliminary slots (2), the winding bars (3, 4) which are embedded in the winding slot (1) are fixed by means of a slot sealing arrangement (8), which slot sealing arrangement (8) also has a double function of sealing the preliminary slot (2) from an air gap (12) of the machine. The slot sealing arrangement (8), which is formed essentially from an upper wedge (5), a lower wedge (6) and a wedge attachment (7), forms, together with the slot walls (13a, 13b) which bound the preliminary slot (2), flow channels (2a) for a gaseous cooling medium for cooling the teeth (15) of the laminated stator core (10).

12 Claims, 1 Drawing Sheet

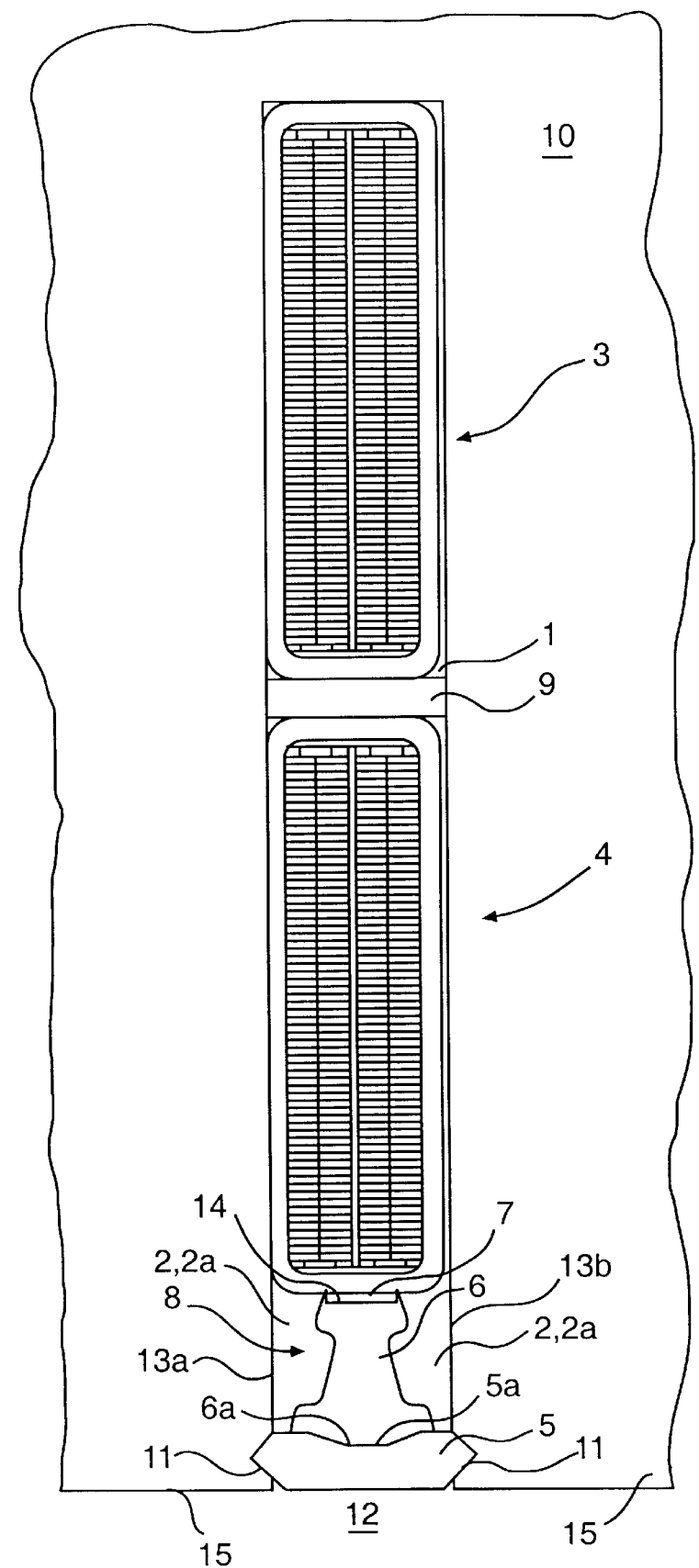

SLOT SEALING ARRANGEMENT

BACKGROUND OF THE INVENTION

1. Field of the invention

The invention relates to an arrangement for sealing the slots in the laminated stator core of an electrical machine. The invention is based on a slot sealing arrangement according to the preamble of patent claim 1.

Slot sealing arrangements of said type are known, for example, from Brown Boveri Mitteilungen [Brown Boveri Memoranda], Year 54, September 1967, Number 9, pages 524–526.

2. Discussion of background

In the case of large electrical machines, in particular generators, winding bars are inserted in a known manner in slots in a laminated stator core, these slots being open toward an air gap. These slots are then sealed with respect to the air gap by means of slot sealing arrangements in order to secure the winding bars. In order to achieve maximum utilization of the radially acting excitation field from a generator rotor, the magnetic flux in the limiting case must penetrate exclusively radially into the teeth of the laminated stator core formed by the winding slots. However, since the slots have a width appropriate for the insertion of the winding bars, the radial penetration of the magnetic flux directly into the bars results in a certain element of the magnetic flux being lost. This loss element can be reduced in a noticeable manner by, as shown on pages 524–526 of Brown Boveri Mitteilungen [Brown Boveri Memoranda], Year 54, September 1967, Number 9, the winding slots in the laminated stator core being formed to be considerably deeper than is necessary for the embedding of the winding bars. Such arrangements thus have a winding slot with a so-called preliminary slot, facing the air gap of the electrical machine. The aim of this arrangement is that the more deeply located winding bars will lead to the radial magnetic flux being concentrated into the teeth of the laminated stator core, and thus to the radial field losses being markedly reduced.

An identical arrangement of stator winding bars in winding slots with preliminary slots in a laminated core is likewise shown in FIG. 4 in U.S. Pat. No. 4,028,569.

One common feature of the winding slots with preliminary slots known from the cited prior art is that they require a slot sealing arrangement of duplicated design. A first slot sealing arrangement is used to seal the winding slot in order to secure the winding bars in the slot, and a second slot sealing arrangement seals the preliminary slot from the machine air gap. The channel-like space which is formed between the first and second slot sealing arrangement is used for deliberate cooling of the teeth (which are thermally highly stressed in limit-rating machines) of the laminated stator core by means of a gaseous coolant.

Major disadvantages of the double slot sealing arrangement are considered to be that they have to be designed with a high level of production-engineering complexity, in which case the more deeply located slot sealing arrangement for the winding bars can be inspected only after removing the slot sealing arrangements in the preliminary slot, and, in addition, the fact that the cooling of the teeth of the laminated stator core is limited.

SUMMARY OF THE INVENTION

Accordingly, one object of the invention is to avoid the said disadvantages by providing a novel slot sealing arrangement which allows slots that comprise winding slots and preliminary slots in laminated stator cores to be sealed in a simple manner while, at the same time, ensuring optimized cooling of the teeth of the laminated stator core which are formed between the slots. As a further aim of the invention, it is intended to be possible to subject the slot sealing arrangements which fix the winding bars to a direct strength test.

According to the invention, the object is achieved by the features in the first claim.

The advantages of the invention are, inter alia, that a single slot sealing arrangement comprising an upper wedge, a lower wedge and a wedge attachment seal both the preliminary slot and the winding slot, that is to say that the force which acts to fix the winding bars in a laminated stator core is exerted directly onto the winding bars by the slot sealing arrangement which seals the preliminary slot, as a consequence of which, in contrast to the prior art, the single slot sealing arrangement carries out a double function.

One particularly preferred embodiment of the invention provides for there to be at least one flow channel for a gaseous cooling medium between the upper wedge, which seals the preliminary slot, and the upper bar of the stator winding. This flow channel is considerably larger than in the case of the prior art for the same slot depth of the winding slot and of the preliminary slot, since there is no need for a second slot sealing arrangement.

Further advantageous refinements of the invention result from the dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

The single FIGURE shows a cross section through a winding slot which is sealed by a slot sealing arrangement and has a preliminary slot positioned in front of it in a laminated stator core.

Only those elements which are essential for understanding of the invention are shown.

DESCRIPTION OF THE PREFERRED EMBODIMENTS

Referring now to the drawing, the single FIGURE shows a cross section of a winding slot 1 in a laminated stator core 10 of an electrical machine, in particular a generator stator, the winding slot 1 being provided with a preliminary slot 2, which points toward an air gap 12. The winding slot 1 merges here without any transition into the preliminary slot 2. A lower bar 3 and an upper bar 4 of the stator winding are embedded in the winding slot 1. The lower bar 3 and the upper bar 4 are spaced apart from one another by means of an intermediate layer 9.

The preliminary slot 2 is sealed from the air gap 12 by a slot sealing arrangement 8. The slot sealing arrangement essentially comprises a lower wedge 6, an upper wedge 5 and a wedge attachment 7. The upper wedge 5 and the lower wedge 6 press the winding bars 3 and 4 against the base of the winding slot 1, as a result of the fact that the upper wedge 5 is supported against recesses 11 in the laminated stator core 10, with the preliminary slot 2 also being sealed from the air gap 12 by the upper wedge 5.

The effective wedge surface of the upper wedge 5 is denoted by 5a and the effective wedge surface of the lower wedge 6 by 6a. The exemplary embodiment according to the invention shows that the wedge surface 5a of the upper wedge 5 has a concave shape while, in contrast, the adjacent wedge surface 6a of the lower wedge 6 has a convex shape. The concave wedge surface 5a and the convex wedge surface 6a are also provided in their longitudinal direction with an inclination of equal magnitude and in opposite directions so that, in the event of any relative movement with respect to one another, they exert a force in the radial direction against the winding bars 3, 4.

Arranged between the lower wedge 6 and the upper bar 4 is a wedge attachment 7, which may also comprise a sliding strip (which is not illustrated). The wedge attachment 7 is held by being guided in a slot 14 in the lower bar. Typically, the upper wedge 5 and the lower wedge 6 are made from a high-strength glass-fiber-reinforced plastic.

The cross section of the lower wedge 6 is considerably narrower than the slot width of the preliminary slot 2 between the slot walls 13a and 13b which bound it. Channel-like spaces 2a are thus formed on both sides of the lower wedge 6, through which spaces a gaseous coolant flows for cooling. The cross section of the cooling channels which are formed is considerably larger than in the case of the prior art since the single slot sealing arrangement carries out a double function, namely that of fixing the winding bars 3, 4 in the winding slot 1, and that of sealing the preliminary slot 2. The cooling channel cross section, which is larger than that in the case of the prior art, allows optimum forced cooling of the teeth 15 of the laminated stator core 10.

In addition to having an enlarged cooling cross section, the slot sealing arrangement 8 according to the invention offers the advantage that it can be subjected to a strength inspection in a simple manner. As a result of seating phenomena caused by thermal and mechanical stresses, it is possible for the wedging-in of the winding bars 3, 4 to become loose. These seating phenomena result in the necessity to carry out a periodic inspection of the slot sealing arrangements, in particular for those which fix the winding bars 3, 4. In the past, it has been known from the prior art that an inspection of the sealing slot arrangement which directly seals the winding slot 1 can be carried out only with major effort, specifically only once the slot sealing arrangement has been completely removed from the preliminary slot 2. The slot sealing arrangement 8 according to the invention and having the described double function now allows the slot sealing arrangement 8 which fixes the winding bars 3, 4 to be checked directly.

The invention is not, of course, limited to the illustrated exemplary embodiment. Also conceivable in the sense of the invention are, for example, a different shape of the lower wedge 6, which allows the cooling channels 2a to have the largest possible cross section subject to provision of the necessary robustness for optimum transmission of the radially acting force for wedging-in. It is likewise conceivable for the concave wedge surface 5a to be provided with a greater radius than the convex wedge surface 6a, and thus to provide a sprung wedging-in effect.

Obviously, numerous modifications and variations of the present invention are possible in the light of the above teachings. It is therefore to be understood that, within the scope of the appended claims, the invention may be practiced otherwise than as specifically described herein.

What is claimed as new and desired to be secured by: Letters Patent of the United States is:

1. A slot sealing arrangement for use in sealing slots in a laminated stator core of an electrical machine, each slot comprising one winding slot and one preliminary slot, the winding slot being filled with winding bars or coils and the preliminary slot being free of winding bars and facing an air gap, the preliminary slot being immediately adjacent to the winding slot, wherein the slot sealing arrangement comprises:

a discrete wedge arrangement capable of sealing the preliminary slot from the air gap and fixing the winding bars in the winding slot;

wherein said discrete wedge arrangement defines at least one channel-like space used as a flow channel for a gaseous cooling medium, the at least one channel-like space being formed between the discrete wedge arrangement and an upper bar which is inserted in the winding slot; and wherein said discrete wedge arrangement includes an upper wedge and a lower wedge, said lower wedge having a first cross-sectional width adjacent the winding slot, a second cross-sectional width adjacent said upper wedge, and a middle cross-sectional width defined therebetween, said middle cross-sectional width being less than said first and second cross-sectional widths so as to increase in size said at least one channel-like space and thereby obtain optimum cooling effectiveness from the gaseous cooling medium in the flow channel.

2. The slot sealing arrangement as claimed in claim 1 wherein the at least one flow channel is essentially bounded by a first slot wall and a second slot wall in the laminated stator core, by the upper bar and an upper wedge of the discrete wedge arrangement, which upper wedge is arranged in recesses in the laminated stator core.

3. The slot sealing arrangement as claimed in claim 1, wherein said discrete wedge arrangement comprises an upper wedge and a lower wedge disposed in engaging contact.

4. The slot sealing arrangement as claimed in claim 1, wherein said preliminary slot defines a first predetermined width, said first cross-sectional width of said lower wedge and said second cross-sectional width of said lower wedge being less than the first predetermined width of said preliminary slot.

5. The slot sealing arrangement as claimed in claim 1, wherein said first and said second cross-sectional widths of said lower wedge extend a predetermined distance within said channel-like space, from said upper wedge toward said winding slot.

6. In a laminated stator core of an electrical machine having slots, each slot comprising one winding slot and one preliminary slot, the winding slot being filled with winding bars or coils, the preliminary slot being free of winding bars and facing an air gap, and the preliminary slot being immediately adjacent to the winding slot, the improvement comprising:

a discrete slot sealing arrangement for sealing the preliminary slot from the air gap and for fixing the winding bars in the winding slot, said slot sealing arrangement defining at least one cooling channel;

wherein said discrete slot sealing arrangement defines an upper cross-sectional width adjacent the winding slot, a lower cross-sectional width, and a middle cross-sectional width disposed therebetween, said middle cross-sectional width being less than said upper and lower cross-sectional widths so as to increase in size said at least one cooling channel and thereby obtain optimum cooling effectiveness from a gaseous cooling medium in said at least one cooling channel.

7. The improvement of claim 6, wherein said discrete slot sealing arrangement includes only one wedge arrangement.

8. The improvement of claim 7, wherein said wedge arrangement includes an upper wedge and a lower wedge in engagement therewith.

9. The improvement of claim 8, wherein said wedge arrangement further includes a wedge attachment in engagement with said lower wedge.

10. The improvement of claim 6, wherein said discrete sealing arrangement provides a means for checking a fixing of the winding bars.

11. The improvement of claim 6, wherein said preliminary slot defines a first predetermined width, said upper cross-sectional width of said slot sealing arrangement and said lower cross-sectional width of said slot sealing arrangement being less than the first predetermined width of said preliminary slot.

12. The improvement of claim 6, wherein said upper and lower cross-sectional widths of said slot sealing arrangement extend a predetermined distance within said channel-like space.

* * * * *